United States Patent [19]

Howard

[11] Patent Number: 5,508,110
[45] Date of Patent: Apr. 16, 1996

[54] METHOD OF MAKING MOISTURE RESISTANT ALUMINUM NITRIDE POWDER AND POWDER PRODUCED THEREBY

[75] Inventor: Kevin E. Howard, Midland, Mich.

[73] Assignee: The Dow Chemical Company, Midland, Mich.

[21] Appl. No.: 351,450

[22] PCT Filed: Jan. 28, 1993

[86] PCT No.: PCT/US93/00978

§ 371 Date: Dec. 8, 1994

§ 102(e) Date: Dec. 8, 1994

[87] PCT Pub. No.: WO93/25496

PCT Pub. Date: Dec. 23, 1993

[51] Int. Cl.$^6$ .................. B32B 5/16; B05D 7/00
[52] U.S. Cl. ............ 428/402; 428/403; 428/405; 427/212; 427/215; 427/397.7
[58] Field of Search ................. 427/215, 212, 427/397.7; 428/403, 405, 402

[56] References Cited

U.S. PATENT DOCUMENTS

| 4,572,844 | 2/1986 | Inoue et al. | 427/212 |
| 5,234,712 | 8/1993 | Howard | 427/215 |

*Primary Examiner*—Shrive Beck
*Assistant Examiner*—David M. Maiorana

[57] ABSTRACT

A method for making a moisture-resistant aluminum nitride-containing powder which includes (a) coatng a layer of silicate onto aluminum nitride-containing powder having aluminum nitride on at least a portion of its surface and (b) heat-treating the coated aluminum nitride-containing powder at a temperature of from 350° to 1000° C. for a period of time sufficient to cause the silicate to react with the surface aluminum nitride thereby forming a layer of Si—Al—O—N bonded to the surface aluminum nitride. The silicate has alkyl or alkoxyalkyl radicals attached thereto. The method yields a moisture-resistant aluminum nitride-containing powder having a layer of Si—Al—O—N reaction-bonded to the surface aluminum nitride.

3 Claims, No Drawings

METHOD OF MAKING MOISTURE RESISTANT ALUMINUM NITRIDE POWDER AND POWDER PRODUCED THEREBY

RELATED APPLICATIONS

This application is a 371 of PCT/US93/00978.

TECHNICAL FIELD

This invention relates to a method for treating aluminum nitride-containing powder to form a protective layer on its surface and the treated powder produced thereby.

BACKGROUND OF THE INVENTION

Aluminum nitride (AlN) powder is an excellent filler material for thermally-conductive polymer composites used as heat sink materials in the electronics industry. However, using virgin aluminum nitride powder in polymer composites is not without its problems. Polymer composites exhibit some water permeability, and, because aluminum nitride is sensitive to hydrolysis, some protection of the aluminum nitride powder from hydrolysis is desired. Additionally, when virgin aluminum nitride powder is stored, air-borne moisture attacks the aluminum nitride powder causing the powder to experience an increase in oxygen content and a concomitant weight gain.

It is, therefore, desirable to provide a moisture-resistant aluminum nitride-containing powder and an easy method for its manufacture.

SUMMARY OF THE INVENTION

A method for making a moisture-resistant aluminum nitride-containing powder is disclosed which comprises
  (a) coating a layer of a silicate onto the aluminum nitride-containing powder having aluminum nitride on at least a portion of its surface, the silicate having substituents thereon selected from the group consisting of alkyl and alkoxyalkyl radicals, and
  (b) heat-treating the coated aluminum nitride-containing powder at a temperature of from about 350° to about 1000° C. for a period of time sufficient to cause the silicate to react with the surface aluminum nitride thereby forming treated aluminum nitride-containing powder having a layer of Si—Al—O—N bonded to the surface aluminum nitride.

In another embodiment of the invention, a method for making a moisture-resistant aluminum nitride powder is disclosed which comprises:
  (a) coating a layer of a silicate onto aluminum nitride powder by
    (i) dispersing the aluminum nitride powder in a first alkyl alcohol having from 1 to 4 carbon atoms, inclusive, to form a dispersion, and
    (ii) dissolving into the dispersion, in the following order:
  (A) a solution of the silicate and a second alkyl alcohol having from 1 to 4 carbon atoms, inclusive, the silicate having substituents thereon selected from the group consisting of alkyl and alkoxyalkyl radicals, the silicate being employed in an amount of from 1 to 150 weight percent based on the weight of the aluminum nitride powder, the first and second alkyl alcohols being employed in an amount of from 50 to 300 volume percent based on the volume of the aluminum nitride powder,
  (B) water being employed in an amount of from 100 to 400 weight percent based on the weight of the silicate, and
  (C) a hydrolysis catalyst that is an organic acid selected from acetic acid, formic acid, and propionic acid or an inorganic acid selected from hydrochloric acid and sulfuric acid or a base selected fro sodium hydroxide, potassium hydroxide and ammonium hydroxide, the hydrolysis catalyst being employed in an amount of from 10 to 75 weight percent based on the weight of the water,
the aluminum nitride powder, the alkyl alcohols, the silicate, the water, and the hydrolysis catalyst forming a dispersion-solution,
  (b) allowing the aluminum nitride powder to contact the remaining components in the dispersion-solution for at least 5 minutes,
  (c) drying the dispersion-solution at moderately elevated temperatures to form coated aluminum nitride powder, and
  (d) heat-treating the coated aluminum nitride powder at a temperature of from 350° to 1000° C. for a period of time sufficient to cause the silicate to react with the aluminum nitride powder thereby forming a layer of Si—Al—O—N bonded to the aluminum nitride powder.

The aluminum nitride-containing powder produced has a layer of Si—Al—O—N reaction-bonded to at least a portion of its surface.

DETAILED DESCRIPTION OF THE INVENTION

The aluminum nitride-containing powder treated in this invention may be (a) a composite powder containing aluminum nitride, at least some of which is at the surface of the powder, or (b) a powder formed substantially of aluminum nitride. With either type of powder, the surface aluminum nitride may or may not have a "skin" of Al—O—N thereon. Although there is no minimum level of surface aluminum nitride for the aluminum nitride-containing powder used in this invention, the level of aluminum nitride in the composite powder is typically at least about 10 weight percent of the composite powder. Examples of other materials which could be combined with aluminum nitride to form composite powders include ceramics, such as silicon carbide, boron nitride, and silicon nitride, or metals, such as titanium, aluminum, and silicon. The aluminum nitride-containing powder which may be used in this invention is not limited in size or amount of surface area.

If desired, the aluminum nitride-containing powder may be contacted with an oxygen containing atmosphere at elevated temperatures prior to the coating step for a time sufficient to oxidize at least a portion of the aluminum-nitride containing powder. The oxygen containing atmosphere is preferably flowing air or air mixed with an inert gas. The oxygen content must be high enough to permit the desired oxidation and low enough to avoid flammability or related hazards. The contact is conducted at elevated temperatures, preferably at from 700° C. to 1100° C., more preferably at from 800° C. to 1000° C. and most preferably at from 850° C. to 950° C. If the temperature is too low, insufficient oxygen is added to the surface. If the temperature is too high, gross oxidation of the aluminum nitride-containing powder occurs. The time of contact is sufficient to obtain the desired increase in oxygen content, preferably by one to ten weight percent. The time is preferably from 5 minutes to 100 hours. A more preferred period of contact is from 10 minutes to 3 hours, with from 30 minutes to 90 minutes being most preferred.

The silicate which is used to coat the aluminum nitride-containing powder has the following general structure:

$$RO(\{RO\}_2SiO)_nSi(OR)_3$$

wherein each R is independently selected from the group consisting of alkyl and alkoxyalkyl radicals, the alkyl and alkoxyalkyl radicals having from 1 to 12 carbon atoms, inclusive, and n is a number from zero to 2, inclusive. In this context, "independently selected" means that each of the R radicals may be the same or different. The alkyl or alkoxyalkyl radicals may be linear or branched and the silicate may be a monosilicate or a polysilicate.

Examples of suitable alkyl silicates include tetramethylorthosilicate, tetraethylorthosilicate, tetra-n-propylorthosilicate, tetraisopropylorthosilicate, tetrabutylorthosilicate, hexamethoxydisiloxane, and octamethoxytrisiloxane. An example of a suitable alkoxyalkyl silicate is tetramethoxyethylsilicate.

Various methods of coating the silicate onto the aluminum nitride-containing powder may be employed in this invention. For instance, the silicate may be applied to the powder by techniques such as chemical vapor deposition or solution coating.

A preferred method for coating the silicate onto the aluminum nitride-containing powder is by solution coating. Generally, this method is performed by coating a solution of the silicate and a solvent onto the aluminum nitride-containing powder and, subsequently, removing the solvent from the coating to form a dry, silicate-coated powder. Preferably, the removal of the solvent is completed before heat-treating the coated aluminum nitride-containing powder at the temperature of from 350° to 1000° C. Examples of solution coating techniques are aerosol coating and slurry coating.

A typical coating solution includes an alkyl alcohol having from 1 to 4 carbon atoms inclusive as the solvent, the silicate, and water. A hydrolysis catalyst may be included in the coating solution to hasten the hydrolysis of the silicate.

The total amount of solvent used in the method merely needs to be enough to assist in applying the coating solution onto the aluminum nitride-containing powder. Preferably, the solvent is employed in an amount from 50 to 300 volume percent based on the volume of the aluminum nitride-containing powder.

In the coating solution, the silicate may be employed at levels of from greater than 1 to 150 weight percent based on the weight of the aluminum nitride-containing powder. However, levels higher than 150 weight percent may be used. When a large enough excess of silicate is used, the outermost material on the final heat-treated powder would contain substantially Si and O. Preferably, the silicate is employed in the coating solution at levels from 5 to 50 weight percent and, more preferably from 5 to 10 weight percent based on the weight of the aluminum nitride-containing powder.

Water is generally employed in an amount from 100 to 400 weight percent based on the weight of the silicate, and more typically, in an amount from 100 to 200 weight percent based on the weight of the silicate.

Useful hydrolysis catalysts include organic acids, such as acetic acid, formic acid, and propionic acid and inorganic acids such as hydrochloric acid and sulfuric acid, and bases, such as sodium hydroxide, potassium hydroxide, and ammonium hydroxide. The amount of hydrolysis catalyst employed merely needs to be a catalytic quantity. The hydrolysis catalyst is generally employed in an amount from 10 to 75 weight percent based on the weight of the water.

To coat the aluminum nitride-containing powder, the coating solution may be prepared first, followed by application of the coating solution onto the aluminum nitride-containing powder. However, it is preferred to: (a) disperse the aluminum nitride-containing powder in a non-aqueous solvent for the silicate to form a dispersion, then (b) dissolve into the dispersion, in the following order: (i) the silicate, (ii) water, and (iii) the optional hydrolysis catalyst. Additionally, the silicate may be added to the aluminum nitride-containing powder dispersion as a solution of the silicate in a solvent such as an alkyl alcohol having from 1 to 4 carbon atoms, inclusive. The optional solvent for the silicate may be the same as or different than the non-aqueous solvent used to prepare the aluminum nitride-containing powder/solvent dispersion.

It is preferred to allow the coating solution to remain in contact with the aluminum nitride-containing powder for at least 5 minutes before subjecting the aluminum nitride-containing powder to drying or to the high-temperature heat-treating step.

After the aluminum nitride-containing powder has been coated with silicate via a solution coating method, the coated powder may be heat-treated directly or the solvent may be removed from the powder to any degree of dryness. However, the powder is preferably dried to a flowable powder. It is preferred not to dry the aluminum nitride-containing powder by filtration, but rather to dry the powder by evaporation. Evaporation allows the silicate to remain with the aluminum nitride-containing powder. Drying methods including thermal or vacuum removal of the solvent may be used. The most desirable methods of evaporating the solvent are by spray drying or by oven drying. Preferably, drying temperatures of from 100° to 150° C. are employed, although other temperatures are suitable.

It is preferred that the coated powder is subjected to moderately elevated temperatures between the coating and heat-treatment, preferably for a period from thirty minutes to twenty-four hours. The exposure to moderately elevated temperatures may be part of the drying step or may follow it. It is preferred that the powder is dried at moderately elevated temperatures. By moderately elevated temperatures, it is meant from 75° to 200° C., more preferably from 75° to 175° C. and most preferably from 100° to 150° C.

Once the aluminum nitride-containing powder is coated with silicate, and preferably dried at moderately elevated temperatures, the coated powder is heat-treated at a temperature of from 350° to 1000° C., more preferably, at a temperature of from 500° to 700° C., and, most preferably, at a temperature of from 500° to 650° C. It is most desirable to perform the heat-treatment step in a flowing oxygen-containing atmosphere, such as air or nitrogen. It is preferred to use oxygen-containing atmosphere such as air.

The heat-treatment step is performed at least until a layer of Si—Al—O—N is formed on the surface aluminum nitride of the powder. Typically, the heat-treatment step is performed for a period of from 10 minutes to 12 hours and, more typically, for a period of from 1 hour to 2 hours.

Optionally, the treated aluminum nitride containing powder may be treated again by (a) coating a second layer of silicate onto the treated aluminum nitride-containing powder and, subsequently, (b) heat-treating the coated treated aluminum nitride-containing powder at a temperature of from 350° to 1000° C. for a period of time sufficient to form an amorphous layer containing Si and O on the surface of the treated aluminum nitride-containing powder. The second silicate used in the second treatment may be the same or different than the silicate used in the first treatment.

The method of performing the second treatment is the same as that described above for the first treatment, except the preferred level of silicate employed in the solution coating is based on the weight of the treated aluminum nitride-containing powder and the preferred level of solvent employed is based on the volume of the treated aluminum nitride-containing powder. In the second coating solution, the silicate may be employed at levels from greater than 1 to 150 weight percent based on the weight of the treated aluminum nitride-containing powder, and the solvent is preferably employed in an amount from 50 to 300 volume percent based on the volume of the treated aluminum nitride-containing powder.

Usually, untreated aluminum nitride powder has a surface layer thereon of Al—O—N of about 20–100 Angstroms (200–1000 nanometers) thick due to oxidation of the aluminum nitride in air. The method of this invention causes silicon and oxygen to be reaction-bonded into the Al—O—N layer, or AlN if Al—O—N is not present, so that an amorphous layer of Si—Al—O—N is created. The Si—Al—O—N layer is about the same thickness of the Al—O—N layer, that is, about 20–100 Angstroms (200–1000 nanometers) thick, thus creating a denser surface layer on the aluminum nitride powder and providing the interior aluminum nitride with better protection from moisture. Due to the reaction-bonding, the final layer of Si—Al—O—N strongly adheres to the surface aluminum nitride on the powder and is not merely coated thereon. The silicon and oxygen are found to be incorporated into the Al—O—N layer in about a 1:1.65 ratio of silicon to oxygen.

When the treated aluminum nitride-containing powder undergoes a second treatment according to the invention, the second treatment adds an amorphous layer of Si and O, which may also contain Al, to the outside surface of the treated powder. Typically, using the solution coating technique, the amorphous layer is a continuous layer having a typical thickness ranging from 60 to 250 Angstroms (600–2500 nanometers). Aluminum nitride-containing powder that has undergone a second treatment according to the invention has superior humidity resistance relative to aluminum nitride-containing powder having undergone only a single treatment according to the invention.

When the aluminum nitride-containing powder is oxidized by contact with an oxygen containing atmosphere at elevated temperatures prior to the coating step, the Si—Al—O—N layer is 40 to 400 Angstroms (400–4000 nanometers) thick. Aluminum nitride-containing powder that has been oxidized prior to a single coating step has superior humidity resistance relative to aluminum nitride-containing powder having undergone only a single treatment, but is not as resistant to humidity as aluminum nitride-containing powder that has not been oxidized prior to the coating step, but has undergone a second coating treatment.

The product of this invention may be used as the ceramic powder in making aluminum nitride-containing ceramic articles. Due to the moisture resistance of the aluminum nitride-containing powder, the ceramic articles may be prepared by first making a slurry of the aluminum nitride-containing powder in water and, subsequently, drying and compacting the slurry to form a greenware article, and sintering the greenware article to form a ceramic article.

The product of this invention may also be used as a ceramic filler in polymer composites, such as epoxy polymers filled with aluminum nitride-containing powder. Such polymer composites are useful as heat sink materials in the microelectronics industry.

The following examples are illustrative only and should not be construed as limiting the invention which is properly delineated in the appended claims.

EXAMPLES

Example 1

25.0 g of aluminum nitride powder having a surface area of 0.6 $m^2/g$ were added to 100 mL of absolute ethanol to form a dispersion. 25.0 mL of tetraethylorthosilicate $(Si(OC_2H_5)_4)$, 25.0 mL HPLC-grade water, and 15 mL of 1N acetic acid were admixed into the aluminum nitride powder/ethanol dispersion in the order listed to form a mixture. The mixture was stirred for one hour and then placed in a round-bottom flask. The powder in the mixture was then partially dried using a water-aspirated vacuum and dried to completion in an oven having a temperature of 120° C. for 18 hours. The dried powder was then fired at 550° C. for one hour in a flowing air atmosphere.

Samples of the treated, fired powder and untreated powder were each placed in glass vials and weighed. The sample-filled vials were then placed in a humidity chamber set at 35° C. and 80% relative humidity for 650 hours. The sample-filled vials were then removed from the humidity chamber, allowed to return to ambient conditions, and re-weighed to determine weight gain due to hydrolysis of the aluminum nitride powder samples. The untreated powder experienced a weight gain of 0.217 percent, whereas the treated powders did not experience a weight gain.

Example 2

2.0 g of aluminum nitride powder having a surface area of about 1 $m^2 g$ was added to 20 mL of absolute ethanol in a beaker to form a dispersion. To this dispersion, 2.0 mL of tetraethylorthosilicate were added to form a mixture, and the mixture was stirred for five minutes. 2.0 mL of HPLC-grade water were admixed to the mixture. After 30 minutes of stirring the mixture, the stirring was ceased, and the beaker was placed in a 75° C. oven for 18 hours. The resultant powder was heat-treated at 600° C. in flowing air for one hour.

Following the same procedure as described in Example 1, the treated, fired powder and untreated powder were placed in a humidity chamber for 100 hours at 85° C. and 80% relative humidity. The untreated powder experienced a 24.781% weight gain, whereas the treated, fired powder experienced a 0.040% weight gain.

Examples 3–7

Using the same coating procedure as described in Example 2, aluminum nitride powder was coated with 1, 5, 10, 20, and 25 weight percent tetraethylorthosilicate (TEOS) per weight of aluminum nitride powder. Each of the treated powders were dried at 120° C. and heat-treated in air at 600° C. for one hour. Samples of the treated powders and of untreated powder were then exposed to 85° C. and 85% relative humidity for 100 hours in a humidity chamber. The weight gain results are shown in Table 1 for the untreated powder and for the treated, fired powders.

TABLE 1

| Example # | Weight % TEOS | % Weight Gain |
|---|---|---|
| — | 0 | 29.369 |
| 3 | 1 | 23.365 |
| 4 | 5 | 2.132 |
| 5 | 10 | 2.066 |
| 6 | 20 | 2.347 |
| 7 | 25 | 1.342 |

Example 8

This example illustrates single and double treating aluminum nitride powder according to the invention.

1700 g of aluminum nitride powder was slurried in 1000 mL of absolute ethanol. To this slurry, a solution of 200 mL tetraethylorthosilicate and 100 mL absolute ethanol were slowly added accompanied by stirring. 200 mL of HPLC-grade water and 50 mL of 1N acetic acid were then admixed to the slurry. After stirring for five additional minutes, the slurry was partially dried under a flowing nitrogen atmosphere for 3 hours. Then, the partially dried slurry was further dried for 2 hours at 120° C. The resultant powder was then heat-treated in air at 550° C. for one hour. A portion of the heat-treated powder was sieved using a 30 mesh screen and reserved as the single-treated powder.

830 g of the above heat-treated powder was slurried in 500 mL absolute ethanol. To this slurry a solution of 100 mL tetraethylorthosilicate and 100 mL absolute ethanol were slowly added accompanied by stirring. 100 mL of HPLC-grade water and 25 mL of 1N acetic acid were then added to the slurry. After 5 minutes of additional stirring, the slurry was partially dried for 2 hours in a flowing nitrogen atmosphere. The partially dried slurry was then further dried at 120° C. for 2 hours, then heat-treated in air at 550° C. for one hour. The resultant powder was sieved through a 30 mesh screen and reserved as the double treated powder.

The single-treated and double-treated aluminum nitride powders were each blended at a level of 73 weight percent in a novalac epoxy resin to form polymer composites. The polymer composites were allowed to cure and exposed to 100% relative humidity and 121° C. to measure the relative levels of weight increase experienced by the two polymer composites.

The polymer composite using the single-treated aluminum nitride powder exhibited a weight percent increase of 1.1916% after 150 hours, 1.380% after 350 hours and 1.488% after 500 hours of exposure to 100% relative humidity and 121° C. In contrast, the polymer composite using the double-treated aluminum nitride powder exhibited a weight percent increase of 0.9422 after 150 hours, 1.058% after 350 hours and 1.142% after 500 hours of exposure to 100% relative humidity and 121° C., thus, illustrating that the double-treated aluminum nitride powder exhibits improved hydrolytic stability relative to the single-treated aluminum nitride powder.

Examples 9 and 10 illustrate contacting an aluminum nitride containing powder with an oxygen containing atmosphere at elevated temperatures prior to the coating step.

Example 9

A 15 gram sample of aluminum nitride having a surface area of approximately 1 m$^2$/g was placed into an alumina boat and heat treated in flowing air at 900° C. for one hour. The resultant powder (14.25 g recovered) was cooled and then slurried in 20 ml of ethanol. 1.4 ml of tetraethylorthosilicate (TEOS), 1.4 ml water and 0.2 ml 1N acetic acid was added to the slurry. After ten minutes, the beaker containing the slurry was moved to a 120° C. oven and the solvent evaporated and the powder dried. This yielded 14.29 g of softly agglomerated powder which was crushed to give a free-flowing powder. The powder was then heat treated in an alumina boat at 550° C. in flowing air for one hour.

The powder was then placed in glass vials and weighed. The vials were then placed in a humidity chamber at 85° C./85% relative humidity for 96 hours. The vials were then removed from the humidity chamber, allowed to return to ambient conditions and re-weighed to determine the weight gain due to hydrolysis of the aluminum nitride powder. The weight gain was 0.780 percent.

Example 10

Sample A—Aluminum nitride powder was placed in an alumina boat and put in a mullite furnace and heat treated with flowing air at 900° C. for 100 hours.

Sample B—Aluminum nitride powder was placed in an alumina boat and placed in a mullite furnace and heat treated with flowing air at 900° C. for 10 hours.

Sample C—Aluminum nitride powder was placed in an alumina boat and placed in a mullite furnace and heat treated with flowing air at 700° C. for 1 hour.

A 10 g portion of each of Sample A, B and C was placed into 50 mL plastic beakers. To each one, 20 mL of absolute ethanol, 1 mL of TEOS, 1 mL of HPLC grade water and 0.2 mL of 1N acetic acid were added in succession. After 5 minutes of stirring, stirring was ceased and the powder mixtures were placed in an oven at 120° C.

Samples A, B and C were then each treated at 600° C. for one hour and then each divided roughly in half. Samples A1, B1 and C1 were each rolled in a mill for one hour. Samples A2, B2 and C2 were left alone. All six samples were then evaluated for humidity stability at 85° C./85% R.H. for 589 hours. Samples A1 and A2 showed weight gains of 1.3441 and 1.3824 percent, respectively. Samples B1 and B2 showed weight gains of 1.2008 percent and 1.4040 percent, respectively. Samples C1 and C2 showed weight gains of 0.3022 percent and 0.1587 percent, respectively.

While my invention has been described in terms of a specific embodiment, it will be appreciated that other embodiments could readily be adapted by one skilled in the art. Accordingly, the scope of my invention is to be limited only by the following claims.

I claim:

1. A moisture-resistant aluminum nitride-containing powder, which comprises aluminum nitride-containing powder having a layer of Si—Al—O—N reaction-bonded to at least a portion of its surface.

2. The moisture-resistant aluminum nitride-containing powder of claim 1, wherein the aluminum nitride-containing powder is formed substantially of aluminum nitride and the Si—Al—O—N layer is from 20 to 100 Angstroms thick.

3. The moisture-resistant aluminum nitride-containing powder of claim 1, further comprising an amorphous layer containing Si and O on the outside surface of the moisture-resistant aluminum nitride-containing powder about the Si—Al—O—N layer.

* * * * *